INVENTOR.
JAMES D. CENTANNI
WILLIAM E. FLEIG
BY
ATTORNEYS

INVENTOR.
JAMES D. CENTANNI
WILLIAM E. FLEIG
BY
ATTORNEYS

Dec. 16, 1969 J. D. CENTANNI ET AL 3,484,750

STATISTICAL ENCODING

Filed Dec. 27, 1966 4 Sheets-Sheet 3

INVENTORS
JAMES D. CENTANNI
WILLIAM E. FLEIG

BY [signature]

ATTORNEYS

INVENTOR.
JAMES D. CENTANNI
WILLIAM E. FLEIG
BY [signature]
ATTORNEYS

United States Patent Office 3,484,750

Patented Dec. 16, 1969

3,484,750

STATISTICAL ENCODING

James D. Centanni, Rochester, and William E. Fleig, Webster, N.Y., assignors to Xerox Corporation, Rochester, N.Y., a corporation of New York Filed Dec. 27, 1966, Ser. No. 605,058
Int. Cl. G11b 13/00
U.S. Cl. 340—172.5 4 Claims

ABSTRACT OF THE DISCLOSURE

A system for encoding and decoding successive groups of binary digits according to a predetermined statistical probability of occurrence. An encoding circuit detects the presence of certain predetermined groups of binary digits and encodes the digits following such groups in accordance with a predetermined statistical code.

BACKGROUND OF THE INVENTION

The signal redundancy inherent in computer or facsimile output waveforms due, for example, to the fact that the waveform comprises two-level binary information and the attendant long periods of little or no information transmission, have led to the development of various encoding techniques to reduce such redundancy, thereby eliminating the wasted transmission time. One such encoding technique is known as run length encoding in which binary numbers corresponding to various blocks or binary data are transmitted rather than the usual binary signals. In such a system, a binary number of relatively few bits may be sent in lieu of a larger block of video data.

In copending applications 571,599, filed Aug. 10, 1966, entitled "Selective Binary Encoding," and 583,901, filed Oct. 3, 1966, entitled "Cascade Run Length Encoding Technique" and assigned to the same assignee as the present application, are disclosed two different techniques for reducing the information to be transmitted to a receiving location. In application 571,599 is disclosed a selective encoding technique wherein each line of binary data is divided and sub-divided in response to the detection of black or printed information according to the informational content on a document. In application 583,901 is disclosed a selective encoding technique utilizing a typical distribution of information on a document to statistically encode the detected lengths of background information into short code word representations. A more frequently occurring run length would be encoded with a shorter word than that of a lesser occurring run length.

As it is desirable to transmit as few signals as possible to a receiving location, while still maintaining an accurate representation of the information to be transmitted, it was found that while the techniques disclosed in the above set forth copending applications significantly reduce the redundant information in the transmitted waveform, further improvement could be made to further enhance the amount of compression. U.S. Patent 3,237,-170, issued Feb. 22, 1966, to Blasbalg et al. discloses an analyzing system which adaptively determines the probability of occurrence of each N-bit sequence and arranges these sequences in order of probability. Then, either by multiple comparison or by table look-up the Shannon-Fano coded character representing the particular bit sequence is generated. The patentees, however, relate that the different embodiments disclosed generate an adaptive, predictive code depending upon the particular binary input pulse train being fed to the system. That is, the patent disclosure allows for the continual updating of the encoding circuit for the statistical probability of occurrence of the input information. Thus, if the input information to the patentees' system changes in relation to the probability of occurrence of specific binary digit groups, the system compensates therefor and continually generates the optimum encoded waveform.

The technique disclosed in the patent necessarily contains circuitry for adaptively monitoring the statistical distribution of the information. This adds to the expense over and above that necessary for an encoder where the statistics of the input information can be accurately predetermined.

OBJECTS

It is, accordingly, an object of the present invention to provide methods and apparatus for efficiently encoding an information waveform according to a predetermined statistical distribution thereof.

It is another object of the present invention to non-adaptively encode a binary pulse waveform in accordance with a predetermined statistical distribution of successive groups of binary digits.

It is still another object of the present invention to further decrease the bandwidth requirement for binary information transmission for a binary pulse train generated by a preceding data source.

It is another object of the present invention to encode a binary pulse waveform in accordance with the statistical probability of successively occurring i.e., di-bit, combinations.

BRIEF SUMMARY OF THE INVENTION

In accomplishing the above and other desired aspects, applicants have invented novel methods and apparatus for non-adaptively reducing the information in a binary transmission system. There is disclosed a novel encoding technique wherein successive groups of two binary digits, commonly termed di-bits, are inspected and subsequently encoded according to the statistical distribution of such di-bits in the information waveform. The binary information waveform, as from the output of the facsimile scanner or computer, or from an encoding circuit for the reduction of redundant information from such a signal source, is investigated and encoded or transmitted unencoded in accordance with the statistical distribution of the information investigated to be of a predetermined nature.

The embodiment disclosed inserts into the information waveform a binary digit or digits in accordance with the specific di-bits following a predetermined di-bit found to occur most often in the input waveform. When the di-bit found to occur most often appears in the waveform, the succeeding di-bit combinations are detected and a predetermined binary code word is inserted. However, the other di-bits occurring in the input information waveform are transmitted unencoded. For example, if the most common di-bit is 11, the next 00, and then 10 and 01 the di-bits occurring least often, every di-bit following the 11 di-bit will be encoded while the other di-bits will be transferred to the output waveform unencoded.

BRIEF DESCRIPTION OF THE FIGURES

For a more complete understanding of the invention, as well as other objects and further features thereof, reference may be had to the following detailed description in conjunction wtih the drawings wherein.

DETAILED DESCRIPTION OF THE INVENTION

Figure 1:
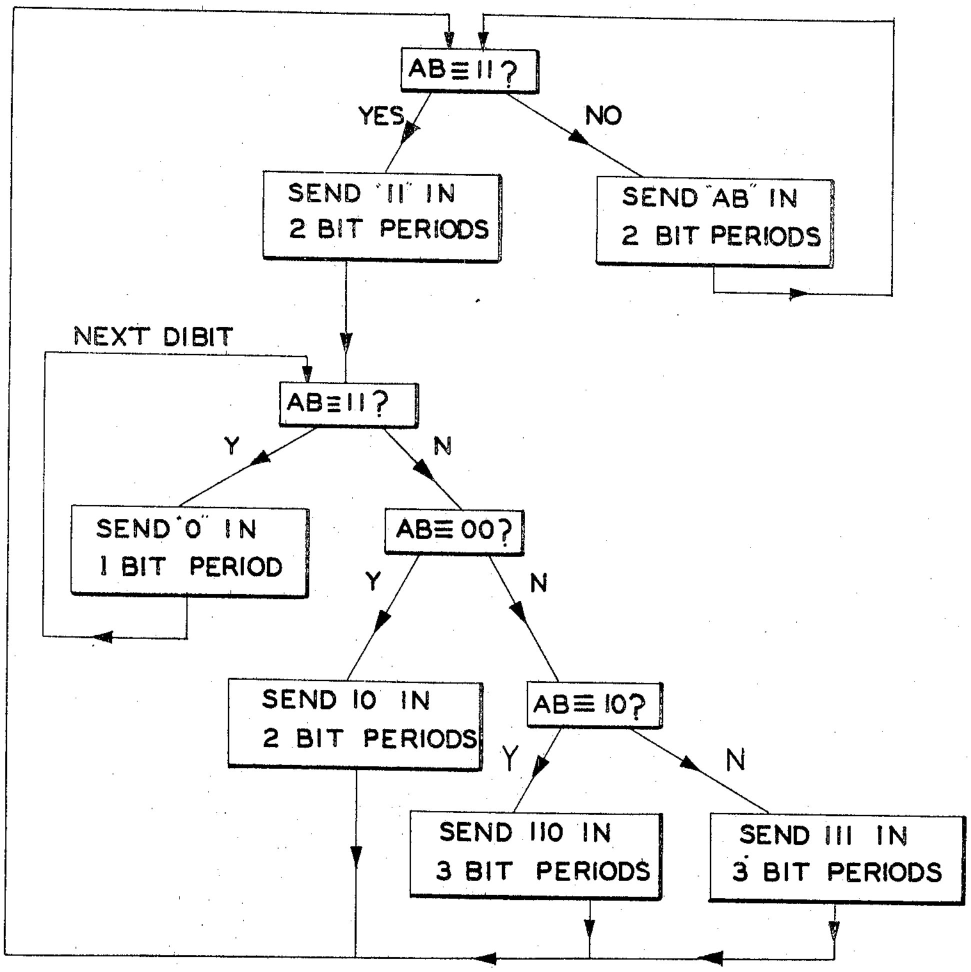
FIG. 1 is a flow diagram illustrating the operation of an encoder in accordance with the principles of the present invention.

There is shown in FIGURE 1 a flow diagram of the encoder in accordance with the present invention. In this embodiment successive di-bits are inspected and when those di-bits are found that follow a predetermined di-bit found to occur in a majority of instances, encoded words representative of these successive di-bits are transmitted in place of the actual di-bits. Successive binary digits can appear in four possible combinations of di-bits, i.e., 11, 00, 10 and 01. For a specific example, it is defined that the probability that two consecutive binary digits, i.e., di-bits, in a binary waveform as from a binary encoder or from a facsimile scanner or computer output, are both binary ones is approximately 0.3, and that the probability that these binary ones are followed by another di-bit of two binary ones is 0.5. Therefore, with a detected di-bit 11, the succeeding di-bit may be encoded according to a code as set forth by D. A. Huffman, "A Method for the Construction of Minimum Redundancy Codes," Proceedings of the IRE, vol. 40, p. 1098, September 1952. Huffman's particular code sequence is not of interest; only that of the method of determining the code. As an example of a suggested probability of occurrence for four binary di-bits Table I can be constructed:

Table I

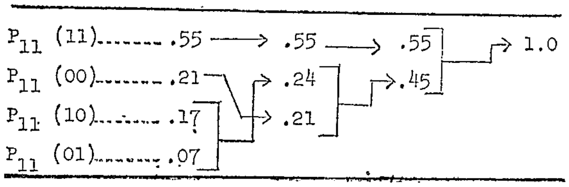

With the above Huffman Table the following Table II can be constructed with which to encode the information for subsequent transmission to a receiving location.

Table II

| Di-bit | No. of bits assigned | code |
|---|---|---|
| 11 | 1 | 0 |
| 00 | 2 | 10 |
| 10 | 3 | 110 |
| 01 | 3 | 111 |

Referring now specifically to FIGURE 1, a flow diagram is shown for the encoding process. As the disclosed encoding technique example is encoding only those di-bits which follow a di-bit combination of 11, any other combination of binary digits will be transferred without the encoding thereof. At the top of the figure, therefore, the encoder determines if a particular incoming di-bit comprises the binary digits of 11. If it is determined that the two binary digits in the di-bit are not a combination of 11 but are one of the other three combinations then the specific di-bit under investigation is transmitted unencoded in predetermined bit periods. If it is determined that the binary digit combination in that specific di-bit is a 11 combination then that combination is transmitted at the same bit period rate.

As it has now been determined that a 11 di-bit combination was detected, the next di-bit combination is investigated, as it is to be encoded. The encoder determines if the second di-bit combination is a 11 di-bit, and transmits a binary zero in one bit period in accordance with the code in Table II above. A bit period here refers to one bit at the transmission rate. If the second di-bit combination was not a 11 combination then the encoder determines if it is a 00 combination. If yes, then a binary combination of 10 is transmitted in accordance with the code set forth in Table II in the next two bit periods. This action would return the encoder to the transmission of subsequent di-bits until another 11 corbination is detected, as the encoder, to reiterate, is only encoding those digits following a 11 combination. To return to the encoding process, if the second di-bit combination after a 11 was not a 00 combination then the encoder determines if it was a 10 combination. If so, in accordance with Table II, a 110 code word is transmitted in the next three bit periods. This action would also cease the encoding process until the next 11 di-bit was detected. If the second di-bit combination was not a 10 combination, however, and it had been determined previously that it was not a 11 or a 00 combination, then it must be a 01 combination and thus, in accordance with Table II, a 111 binary word is transmitted the next three bit periods.

Figure 3:
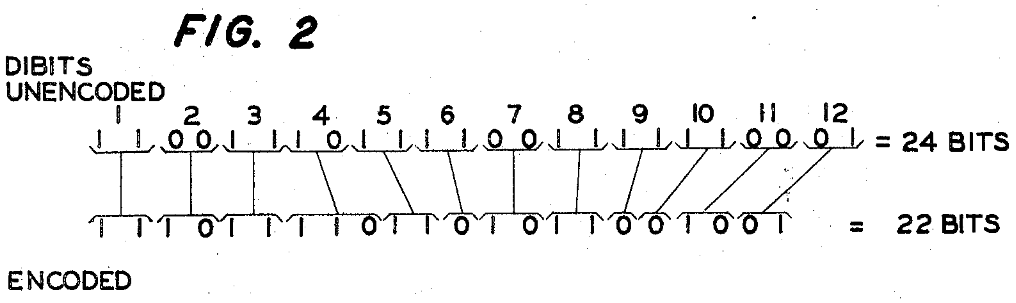
FIG. 3 is a representative diagram of part of a binary data train useful in understanding the various aspects of the present invention.

It would appear that the transmission of a three bit binary word for a detected di-bit would actually increase the amount of information rather than decrease the transmitted information. On the contrary, however, as the 11 di-bit combination has been defined to occur at least thirty percent of the time and given a 11 di-bit, it is followed by a 11 di-bit at least fifty percent of the time, then the transmission of a binary zero for the succeeding 11 di-bit would actually decrease the amount of information to be transmitted. This can be seen with reference to FIGURE 3. As is shown, the first 11 di-bit would be transmitted unencoded as 11. The 00 di-bit following would be encoded as a 10 di-bit. As any other di-bit but 11 ceases the encoding operation, the next 11 di-bit would be transmitted as a 11 di-bit. The succeeding 10 di-bit would then be encoded as 110. The fifth 11 combination di-bit would be transmitted unencoded as 11. The next 11 di-bit, as it follows a 11 di-bit, is encoded with a single binary 0 digit. The 00 or seventh di-bit following is encoded as a 10 di-bit, ending the encoding process. The eighth 11 di-bit is transmitted unencoded as a 11 di-bit. The next two 11 di-bits are encoded and transmitted as 0 binary digits. The eleventh di-bit is encoded as a 10 di-bit, while the last 01 di-bit is transmitted unencoded as a 01 di-bit. It can be seen that 24 unencoded binary digits in the 12 di-bit example are encoded with 22 binary digits. In this representative example, therefore, a saving of two binary digits in 24 can be obtained.

Figure 2:
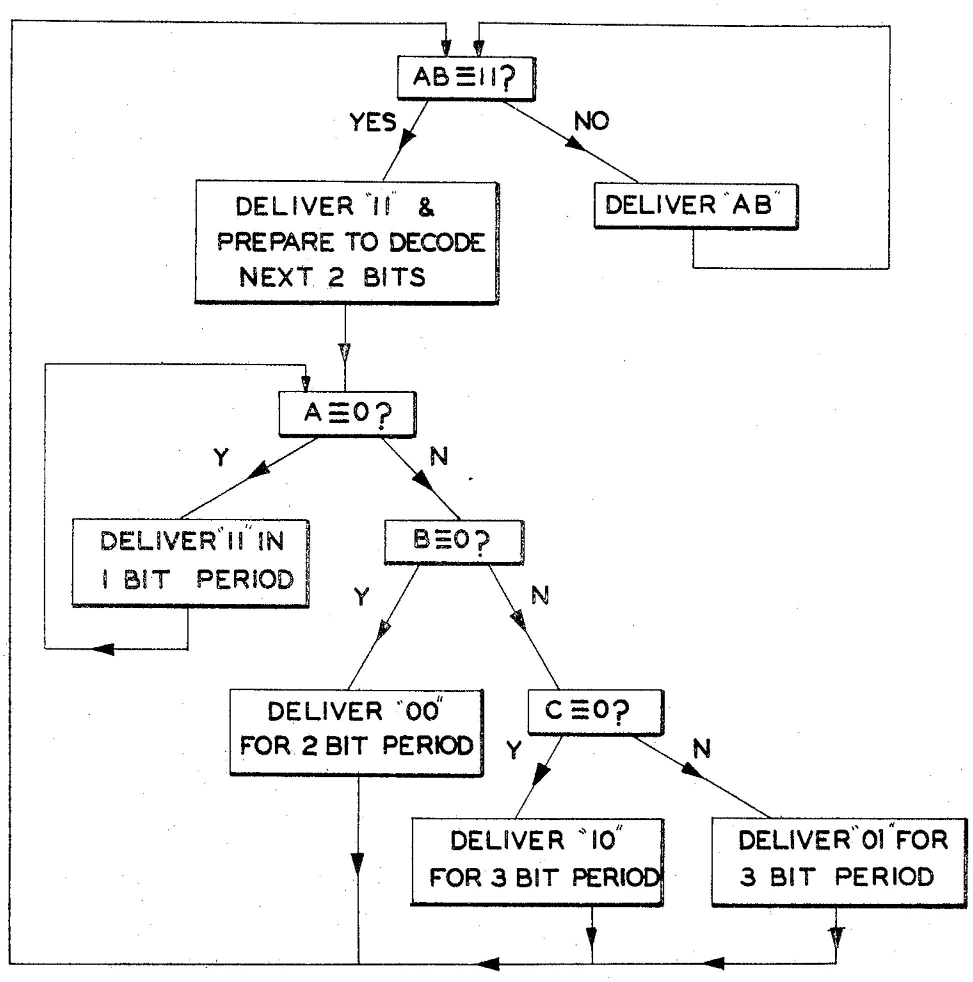
FIG. 2 is a flow diagram illustrating the operation of a decoder in accordance with the principles of the present invention.

The steps for decoding the transmitted encoded information is shown in FIGURE 2. In a manner similar to that described in conjunction with FIGURE 1, the steps in FIGURE 2 show the inspection of the incoming information and the decision of whether the information is encoded or unencoded information. As only the di-bits succeeding a di-bit of 11 are encoded, the receiving decoder knows that all incoming information is to be transferred without modification until a di-bit of 11 is detected. Thus, in a non-coding cycle if the incoming di-bit is not a 11 combination, that di-bit is transferred without the encoding thereof, and the next two binary digits comprising the next di-bit are advanced into the decoder to be inspected. If the next di-bit is a 11 combination, it is delivered unencoded, but the decoder is conditioned to examine the next binary digits, knowing that an encoded word follows.

If the first binary digit is a binary 0, then the encoder detects that a 11 combination follows the first 11 di-bit and thus transfers the binary digits 11 to its output during one bit at the transmission rate. If the first binary digit was not a binary 0 and the second input binary digit is a binary 0 digit, indicating the code 10 for the digits 00 then the decoder delivers the binary digit 00 to the output. If the second binary digit is inspected and if it is not a binary 0 digit and the third binary digit is a binary 0 digit, then a binary digit combination of 10 is delivered to the output for a three bit period. Thus, the decoder operates by transferring the incoming information to the output unchanged except when a 11 di-bit appears in the output in accordance with the code set forth in Table II above. As it has been stated that given a 11 di-bit it is followed by a 11 di-bit more than 50% of the time, information compression would have been present as described above in conjunction with FIGURE 3.

Figure 4:
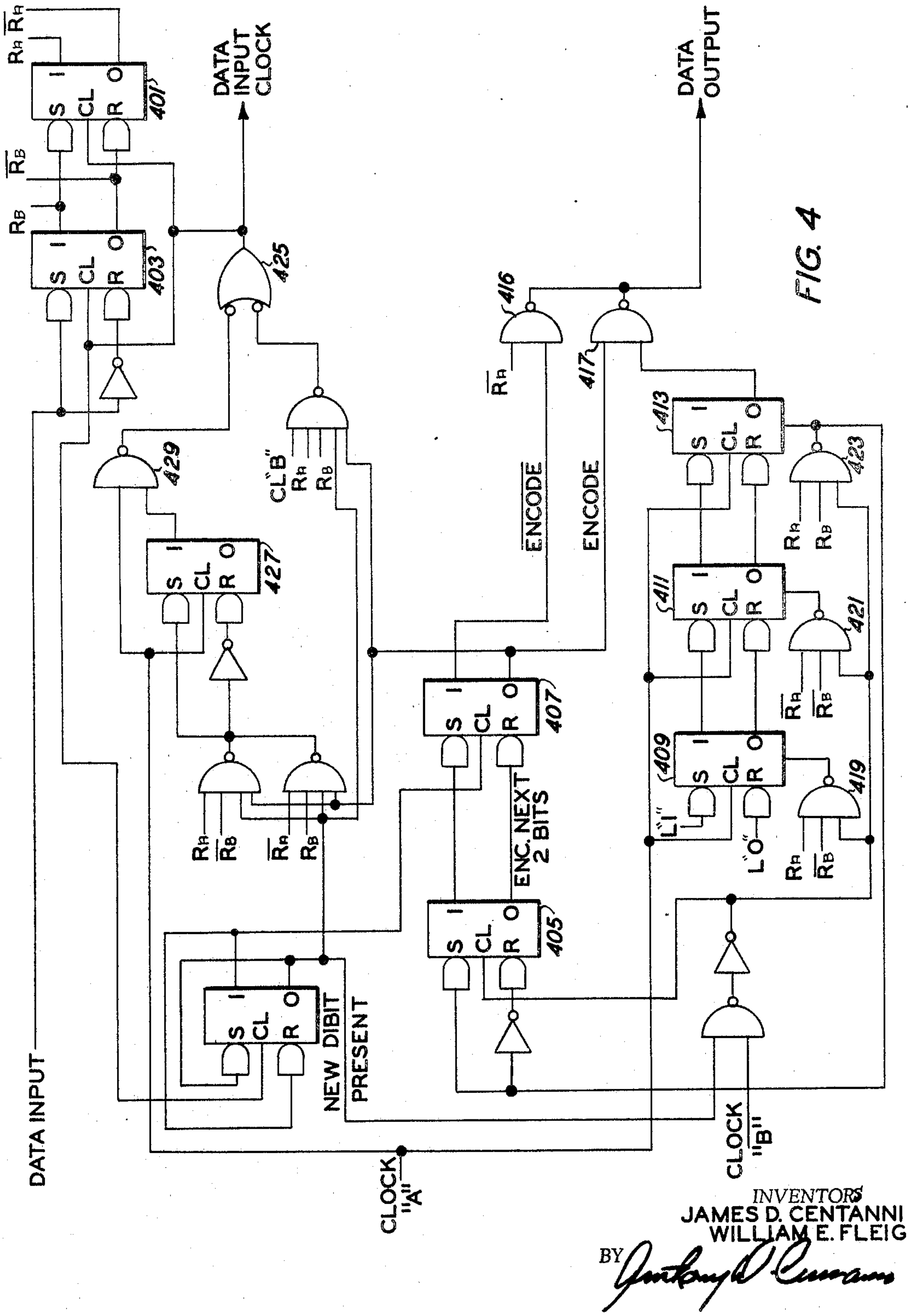
FIG. 4 is a detailed description of the encoder in accordance with the principles of the present invention.

The logic diagram for the encoder is shown in FIGURE 4. One bit of data from a signal source, such as a buffered facsimile scanner, computer output, or from a bandwidth compression encoder, is shifted to the encoder at the clock rate noted as data input clock. As long as the di-bits entering the encoder are not 11 di-bits, they are transferred out on the data output line unchanged. This is accomplished by shifting the data through flip-flop 403, flip-flop 401 and gate 416. When a 11 di-bit is encountered, it is also shifted through the above path unaltered. However, the 11 di-bit resets flip-flop 405 which in turn resets flip-flop 407 just after the di-bit is shifted through the gate 416. This now blocks gate 416 and unblocks gate 417. Thus, the next bits transferred out on the data output line will be encoded bits through gate 417. This code is forced into flip-flops 409, 411 and 413 through gates 419, 421 and 423 at a clock time noted as clock B, a clock time between clock A pulses. These clock pulses would be generated by any known clock pulse generators, not shown.

If the code generated is a one bit code for another succeeding 11 di-bit the incoming data is shifted not only by clock A, but also by clock B, so that a new di-bit is present for the next clock A. It is noted that one bit of data is shifted into the encoder for each data input clock delivered by gate 425. Encoding continues in this manner until a di-bit other than a 11 combination appears.

If the code forced into flip-flops 409, 411 and 413 is a three bit code, flip-flop 427 resets and blocks one clock A pulse from shifting in additional data. Thus, a new di-bit is present only after three bits have been shifted out of the encoder on the data output line. If the code shifted into flip-flops 409, 411 and 413 is a two bit code for the 00 di-bit, the incoming and outgoing data simply continues to shift at the clock A clock times. In any of these cases, flip-flop 405 notes that coding is to stop after the present di-bit is transferred. After it is sent, flip-flop 407 is set, blocking coded data at gate 416. Data output occurs at every clock A pulse.

Figure 5:
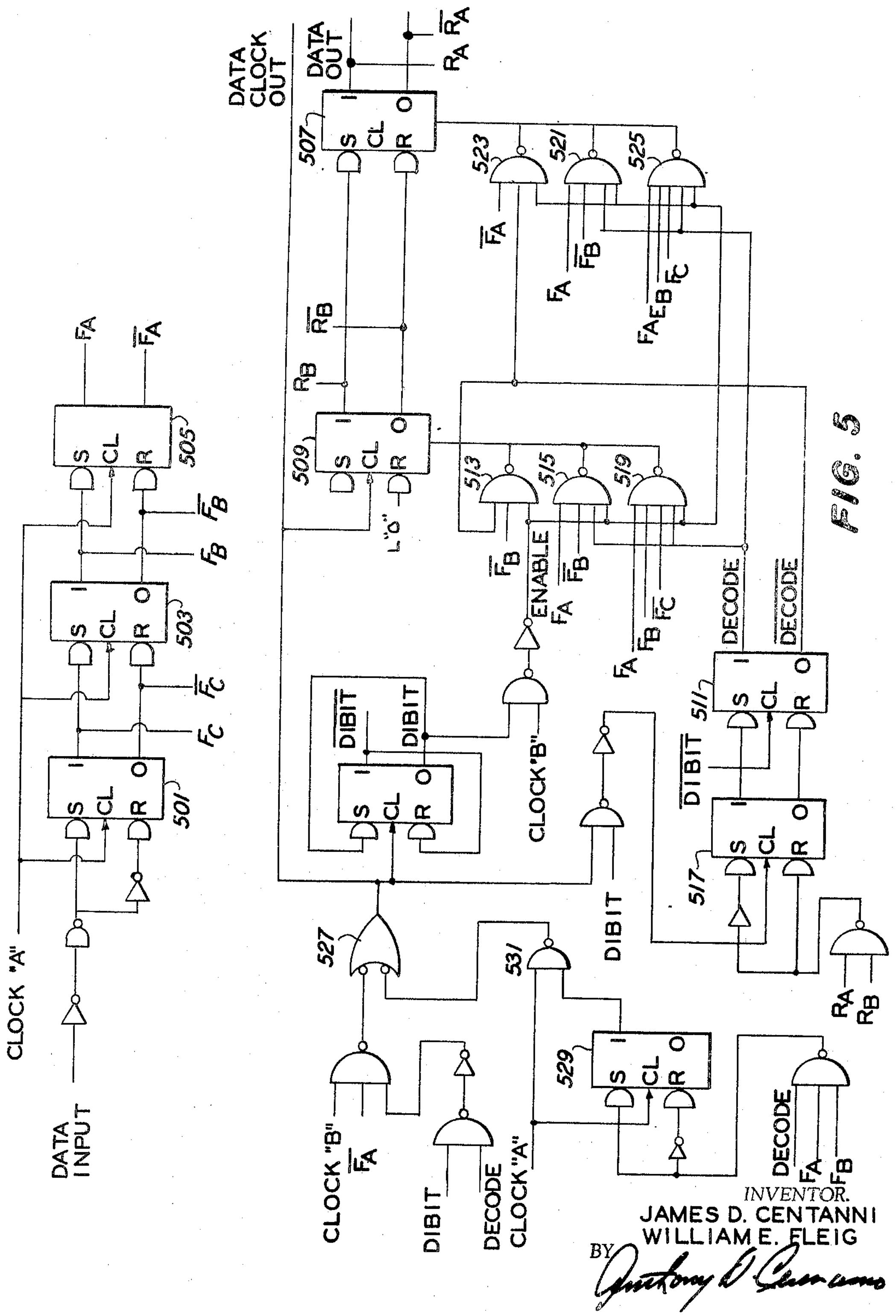
FIG. 5 is a detailed description of the decoder compatible with the encoder in FIG. 4 and in accordance with the principles of the present invention.

Referring now to FIGURE 5, there is shown the logic diagram for the decoder which operates in conjunction with the encoder shown and described in FIGURE 4. Each clock A shifts one bit of data from the data input line into the shift register comprised of flip-flops 501, 503 and 505. If the previous di-bit forced into flip-flops 507 and 509 was not a 11 combination, then flip-flp 511 is reset. This permits gates 513 and 523 to force the next di-bit into flip-flops 507 and 509. In this case, data is delivered on the output line from the decoder at the rate of one bit at each clock A pulse, and this data is simply the data that appeared on the input line to the encoder of FIGURE 4.

Once a 11 di-bit is forced into flip-flops 507 and 509, flip-flop 517 is set. This indicates that the next data on the input line represents encoded data. Thus, after the 11 combination is shifted out, flip-flop 511 is also set, allowing gates 515, 519, 521 and 525 to force the next di-bit into flip-flops 507 and 509. If the new code forced in is also a 11 combination di-bit, it is shifted out not only by clock A, but also by a clock B pulse so that a new di-bit can be handled by the next clock A pulse. It is noted also that the pulses from the gate 527 shifts data out to any type of variable clocked utilization device.

If the code shifted into flip-flops 507 and 509 is a 10 combination or a 01 combination, one clock A pulse is blocked from shifting it out by flip-flop 529 and gate 531. This allows the shift of the three incoming bits representing 10 combination or 01 combination before the next di-bit is handled. If a 00 di-bit is forced in flip-flops 507 and 509, data is shifted both in and out on clock A pulses. In any of these cases, flip-flop 517 is reset so that the next di-bit handled will be treated as unencoded di-bit and pass through gates 514 and 523.

In the foregoing, there has been disclosed methods and apparatus for efficiently encoding and decoding binary waveforms in a buffered facsimile or computer system. While the embodiments have been described in conjunction with a particular di-bit combination and associated probabilities of occurrence, any such distribution could be encoded in accordance with the principles of this invention. Additionally, only those di-bits occurring after a particular di-bit combination has been encoded, but it is obvious that the invention could be extended to cover the encoding of any particular combination of di-bits. Moreover, the encoder and decoder has been described in conjunction with a particular logic arrangement, but it is apparent that other logic combinations could be utilized to perform the encoding and decoding operations. Therefore, while the present invention, as to its objects and advantages, as described herein, has been set forth in specific embodiments thereof, they are to be understood as illustrative only and not limiting.

What is claimed is:

1. In an information transmission system a circuit for encoding successive binary di-bits comprising shift register means for serially storing said di-bits, an output terminal, first and second flip-flop means for monitoring the presence of a particular di-bit combination in said shift register means, first gating means coupled to said second flip-flop means being enabled when said first and second flip-flop means detect said particular di-bit combination in said shift register means, second gating means coupled to said shift register means for generating code words at a first clock time in response to the next di-bit detected at the shift register means after a di-bit of predetermined binary bit combination was detected by said first and second flip-flop means, third gating means for transferring unencoded di-bits from said shift register means to said output terminal at a second clock rate, and third, fourth, and fifth flip-flop means for transferring said generated code words through said enabled first gating means at the second clock rate to said output terminal.

2. The encoder as defined in claim 1 further including sixth flip-flop means responsive to the code stored in said third, fourth, and fifth flip-flop means for delaying the input of additional di-bit information until said generated code words are transferred.

3. In an information transmission system, a non-adaptive encoder for encoding successive groups of binary digits which occur with a predetermined statistical probability of occurrence comprising storage means for storing an input group of binary digits, means coupled to said storage means and responsive to the contents thereof for generating an encode signal when the group in said storage means has a particular predetermined combination and an encode not signal when the group in said storage means has a combination different from said predetermined combination, coding means responsive to the input group of binary digits immediately following an input group having said predetermined combination for generating a predetermined code word, an output line, first gating means coupled to said storage means and responsive to said encode not signal for transferring the contents of said storage means to said output line, and second gating means responsive to said encode signal for transferring said code word to said output line.

4. In an information transmission system wherein successive groups of binary digits are investigated in accordance with a predetermined statistical probability of occurrence, the method of non-adaptively encoding said binary digit groups comprising the steps of storing each of said groups of binary digits;

determining a coincidence or non-coincidence between a stored group of binary digits and a particular binary digit combination;

encoding with a unique binary code the stored group of binary digits immediately preceded by a group of binary digits the combination of which coincide with said particular binary digit combination;

transmitting said binary code;

transmitting unencoded those stored groups of binary digits which are not preceded by a group of binary digits the combination of which coincide with said particular binary digit combination.

References Cited

UNITED STATES PATENTS

| | | | |
|---|---|---|---|
| 3,121,860 | 2/1964 | Shaw | 340—172.5 |
| 3,185,824 | 5/1965 | Blasbalg et al. | 235—154 |
| 3,237,170 | 2/1966 | Blasbalg et al. | 340—172.5 |

PAUL J. HENON, Primary Examiner

RONALD F. CHAPURAN, Assistant Examiner